April 2, 1963  B. S. O. ALMÉN  3,083,442
MILLING CUTTER HAVING CUTTING INSERT REFERENCE MEANS
Filed Oct. 10, 1960  2 Sheets-Sheet 1
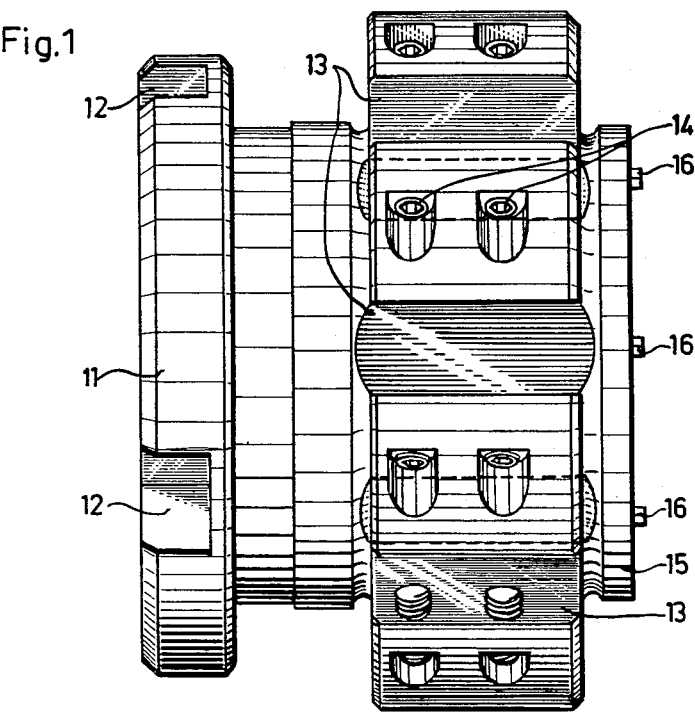
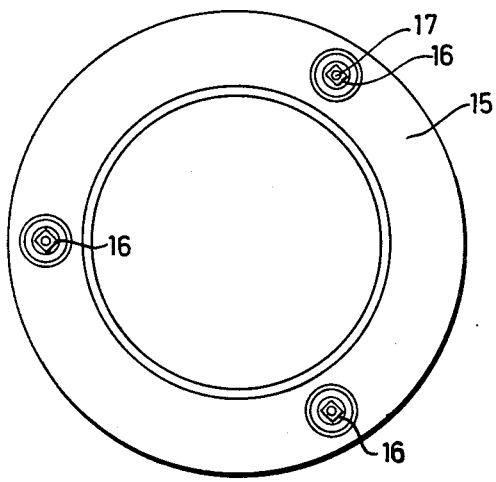
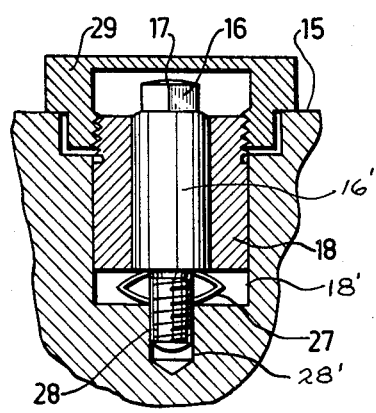
Inventor
Bengt Sven Olof Almén
By Pierce, Scheffler & Parker
Attorneys April 2, 1963   B. S. O. ALMÉN   3,083,442
MILLING CUTTER HAVING CUTTING INSERT REFERENCE MEANS
Filed Oct. 10, 1960   2 Sheets-Sheet 2
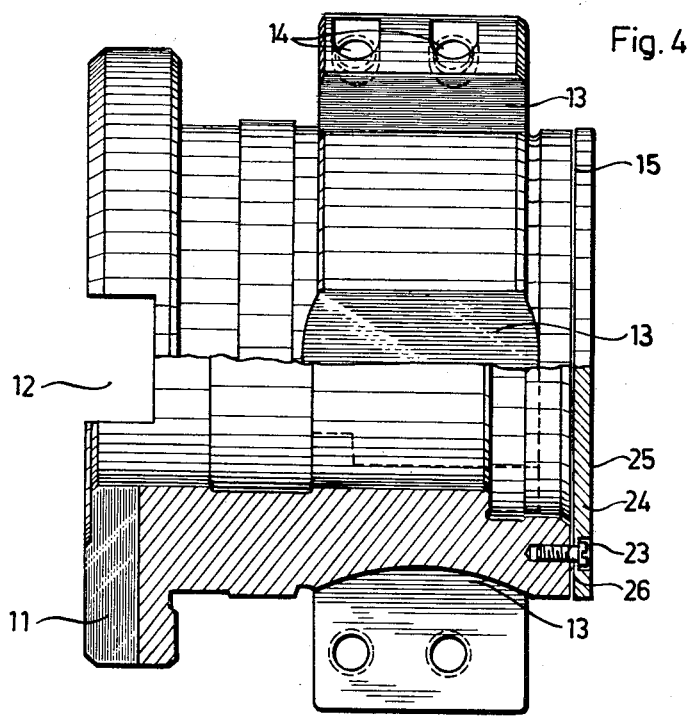
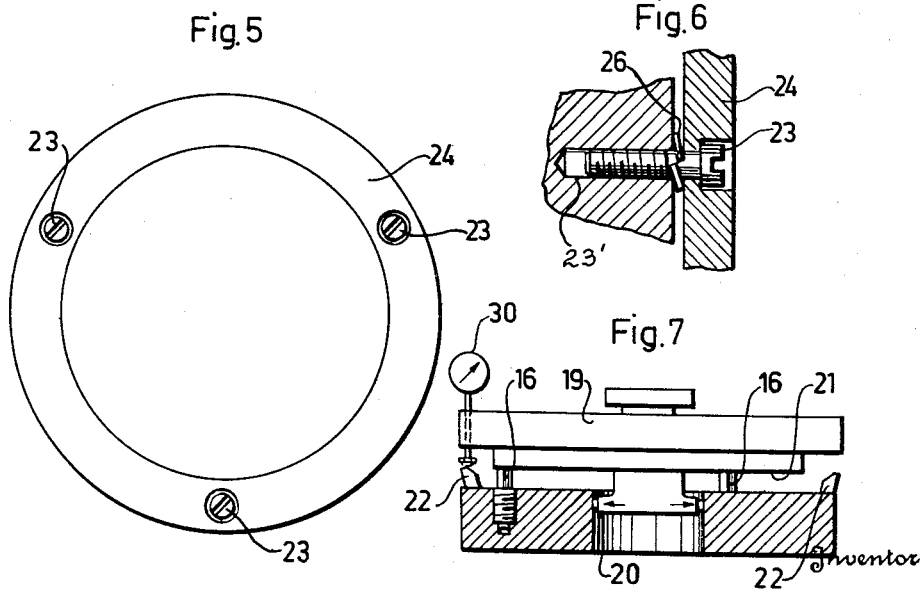
Inventor
Bengt Sven Olof Almén
By
Price, Scheffler & Parker
Attorneys

United States Patent Office 3,083,442
Patented Apr. 2, 1963

3,083,442
MILLING CUTTER HAVING CUTTING INSERT REFERENCE MEANS
Bengt Sven Olof Almén, Udden, Forsbacka, Sweden, assignor to Sandvikens Jernverks Aktiebolag, Sandviken, Sweden, a corporation of Sweden
Filed Oct. 10, 1960, Ser. No. 61,521
Claims priority, application Sweden Oct. 12, 1959
4 Claims. (Cl. 29—105)

This invention relates generally to a milling cutter, and more particularly to a milling cutter provided with reference means defining a reference plane from which the relative axial and/or radial positions of the cutting inserts on the cutter body may be very accurately determined.

In the manufacture and assembly of milling cutters, particularly milling cutters of the end plane cutter type, it is ordinarily quite difficult to properly and accurately position the cutting inserts on the cutter body so that the cutting edges of the inserts lie in a uniform plane or within a uniform surface of generation. For the most part, a machining or grinding operation is required after the cutting inserts have been clamped or rigidly secured (by brazing, for example) to the cutter body so that the cutting edges of the inserts will be properly oriented.

The difficulty in properly positioning the cutter inserts on the cutter body lies to a large extent upon the fact that it is substantially impossible to provide an exact reference surface on the cutter body from which axial or radial measurements for the relative positions of the cutter inserts may be taken. Even a carefully machined surface on the cutter body will be subjected to distortion and will not be exactly perpendicular to the rotational axis of the cutter body.

When the cutter head is connected to its driving spindle, the insert corners will often be displaced from the correct axial position due to inaccuracies of the spindle and the mounting of the cutter body thereon and due to the occurrence of foreign particles on the connecting surfaces between the elements. Another reason for the inaccurate axial positioning of the cutting inserts relative to a plane normal to the axis of rotation of the cutter body is the deformation of and stresses which occur in the cutter body as a result of the great pressures developed when the screws or bolts for clamping the cutter onto its spindle and the clamps for clamping the inserts in their respective recesses are tightened.

In the past it has been proposed to provide insert setting devices dependent solely upon the cutter body structure, which devices present the major drawback that if the cutter body is slightly eccentric or inclined relative to its axis of rotation, the error will be transmitted to the cutting inserts. The same will be the case if the cutter body is uneven or irregular, and the clamping forces which arise when the cutter body is connected to the spindle may also cause such irregularities.

According to the present invention, adjustable reference means are provided on the forward end of the milling cutter body for accurately determining a reference plane from which measurements may be taken to properly locate the cutting inserts axially and/or radially on the cutter body.

Thus the primary object of my invention is to provide a milling cutter having adjustable reference means thereon which may be adjusted when the cutter body is mounted on its driving spindle to define a reference plane which is at a predetermined angle (generally normal) relative to the axis of rotation of the cutter.

A more specific object of my invention is to provide a milling cutter having a plurality of reference bolts or screws extending axially from the cutting (i.e. forward) end of the cutter body, said reference bolts being connected by a tight screw-thread fit to said cutter body for rotational axial adjustment relative to said cutter body, said reference screws being adjustable with the aid of known measuring or indicating means connected to the spindle frame or other fixed support so that the free ends of the reference bolts will define a reference plane normal to the axis of rotation of the cutter body from which measurements of the positions of the cutting inserts may be taken.

Another object of the invention is to provide a milling cutter having a reference plate adjustably connected to the forward end of the cutter body by means of connecting bolts connected by a tight screw-thread fit to the cutter body for rotational axial adjustment relative to said cutter body, said reference plate having an accurately machined planar end surface at the forward side thereof, whereby adjustment of the connecting bolts with the aid of known measuring or indicating means connected to the spindle frame or other fixed support will cause the reference surface of said plate to be at a predetermined angle (generally 90°) to the axis of rotation of said cutter body.

Other objects and advantages of the present invention will become more apparent from a study of the following specification when considered in conjunction with the accompanying drawings in which:

FIG. 1 is a side elevational view of the milling cutter body;

FIG. 2 is an elevational view of the forward end of the milling cutter body showing the location of the three reference bolt means;

FIG. 3 is a detailed sectional view illustrating the connection of the reference bolt to the cutter body;

FIG. 4 is a partially-sectional side elevational view of a second embodiment of the invention;

FIG. 5 is an end elevational view of the forward end of the milling cutter of FIG. 4;

FIG. 6 is a detail sectional view of the connecting bolt means of FIG. 4 for securing the reference plate to the milling cutter body; and FIG. 7 indicates the manner in which the setting plate is supported on the reference bolt means of FIG. 1 during the positioning of the cutting inserts in the cutter body recesses.

Referring first more particularly to the embodiment of FIGS. 1–3, the milling cutter body is provided at its rearward end with a coupling flange 11 having grooves 12 by means of which the cutter body is connected to the cutter drive spindle (not shown). The cutter body is provided with recesses 13 in which the cutting inserts (not shown in FIGS. 1–3) are removably connected by means of suitable known clamping means 14.

The forward end surface 15 of the cutter body is substantially planar and may be machined to have a smooth finish if desired. Unfortunately, due to possible inaccurate mounting of the cutting body on its spindle and for other reasons as mentioned above, if very high accuracy is desired in the positioning of the cutting inserts in the cutter body, the end surface 15 itself cannot be used as a reference surface for supporting the insert setting gauge.

According to the present invention, a plurality of reference bolts 16 are mounted in the end surface 15 of the cutter body and extend axially therefrom as shown in FIG. 1. Referring to FIG. 2 it will be seen that the bolts 16 are secured at angularly spaced points of equal radius from the center of rotation of the cutter body. The head of the reference bolt 16 may be non-circular (polygonal, for example) so that the bolt may be rotated for axial adjustment by suitable wrench means as desired, and the bolt head terminates at its free extremity in a curved, planar or pointed surface 17.

As shown in FIG. 3, the reference bolt is provided with a threaded shank portion 28 which is screwed—preferably with a close running or tight fit—within the screw-thread bore 28' in the cutter body. In some cases the bolt may have a body portion 16' extending through a bushing 18 mounted within the recess 18' in the milling cutter body. Resilient spring means 27 (such as a spring type washer, for example) are provided intermediate the bottom of recess 18' and the bolt body portion 16' for urging the bolt axially in a direction to prevent play in the connection of the threads 28 and also to prevent undesired rotational movement of the bolt due to vibration developed during rotation of the milling cutter body.

In order to protect the head of the bolt during transportation of the cutter body and during installation of the same on the drive spindle, a protective cap 29 may be provided which is connected by screw thread means to the bushing 18 as shown in FIG. 3.

After the cutting body is secured to the drive spindle, the reference bolts 16 are rotated for axial adjustment so that their bolt head extremities 17 define a plane normal to the axis of rotation of the cutter body, (which in the ideal case, coincides with the longitudinal axis of the cutter body). The axial adjustment of the bolts is accomplished statically or dynamically with the aid of known measuring or indicating means (optical, electrical, or mechanical) secured to a fixed support (such as the cutter frame or stand). The bolts 16 are firmly maintained in their adjusted position by the tight cooperation of the screw threads 28 with the threaded bore 28' and by the operation of the resilient means 27, a lock washer, or the like.

The cutting inserts 22 may now be inserted into the recesses 13 in accordance with the procedure illustrated in FIG. 7. Since the reference bolts 16 have been axially adjusted so that their head extremities 17 define a reference plane normal to the axis of rotation of the cutter body, when the setting gauge or plate 19 is placed with its accurately machined planar rear face 21 in contiguous engagement with the bolt extremities 17, said rear face 21 of the setting plate will also be absolutely normal to the axis of rotation of the cutter body. The setting plate 19 may be oriented on the cutter body by means of an axial projection extending within a central opening 20 in the cutter body. By means of the dial gauge 30 carried by the setting plate 19, the position of the cutting inserts 22 (i.e., the extent by which the cutting inserts extend axially from the cutter body) may be accurately determined after which the cutting inserts are rigidly mounted in place by the clamping means 14. The radial orientation of the cutting edges of the cutting inserts 22 may be determined in a similar manner.

Referring now to the embodiment of FIGS. 4–6, common fastening bolts or screws 23 are provided instead of the gauge bolts 16 of the embodiment of FIGS. 1–3, and these fastening bolts serve to connect a reference plate 24 to the front face 15 of the cutter body. The reference plate 24 is provided with an accurately machined forward or front face 25. Referring to FIG. 6 it will be seen that each connecting bolt 23 extends through an aperture in the reference plate and has a threaded shank portion threadably connected within the threaded bore 23' of the cutter body. The head of the bolt 23 is mounted within a recess in the reference plate so that it will not extend axially beyond the planar reference surface 25. Spring means 26 (such as a resilient washer or the like) are provided intermediate the cutter body and the reference plate 24 to urge said reference plate away from the cutter body into engagement with the head of the bolt 23. By rotational axial adjustment of the bolts 23 and by the use of known measuring or indicating means removably secured to a fixed support (such as the drive spindle frame), the planar front surface 25 of the reference plate 24 may be caused to lie normal to the longitudinal axis of rotation of the cutter body. Loose play of the bolt 23 and undesired rotation thereof is prevented both by the tight fit of the screw threads of the shank portion of the bolt within the threaded bore and by the biasing force of the spring means 26. In a manner similar to that illustrated in FIG. 7 the reference plate surface 25 may serve as the reference plane for determining the axial (and radial) positions of the cutting inserts, which subsequently are rigidly clamped into position.

The present invention is applicable for use with various types of cutters, such as those having brazed inserts, "throw-away" inserts, rockable inserts, and the like.

While in accordance with the provisions of the patent statutes I have illustrated and described the best forms and embodiments of the invention now known to me, it will be apparent to those skilled in the art that other changes and modifications may be made in the apparatus described without deviating from the invention set forth in the following claims.

I claim:

1. In combination with a face milling cutter body having means at the rearward end thereof for mounting the same on a drive spindle and having cutting insert retaining means comprising recesses and clamping means associated therewith for clamping cutting inserts in said recesses, an adjustable reference means indicating a gauging plane perpendicular to the true operational axis of rotation in a given operational set up, said reference means comprising three screw-threaded bores in said forward end which are spaced from the body axis and from each other, screws having a threaded portion at one end thereof and threaded in said bores providing tripod adjustment, accurately finished means at the other end of said screws defining at least points in said gauging plane whereby a setting gauge having a plane contact surface can contact said gauging plane in order to set cutting inserts accurately with respect to the said true axis and each other, and spring means positioned to exert axial pressure on said screws.

2. The combination of claim 1 wherein the said accurately finished means of said reference means is a plate secured to said body by said screws and wherein said spring means also axially pressures said plate against heads on said screws at the other end thereof.

3. The combination of claim 1 wherein the said cutter body has a coaxial setting gauge opening.

4. The combination of claim 1 wherein the said accurately finished means are forward convex surfaces at the said other end of said screws.

References Cited in the file of this patent
UNITED STATES PATENTS

| | | |
|---|---|---|
| 1,410,350 | Smith | Mar. 21, 1922 |
| 2,192,343 | Earl | Mar. 5, 1940 |
| 2,415,136 | Jerome | Feb. 4, 1947 |
| 2,524,301 | Bauer | Oct. 3, 1950 |
| 2,553,570 | Flynn | May 22, 1951 |
| 2,674,146 | Rice | Apr. 6, 1954 |
| 2,884,700 | Bergstrom | May 5, 1959 |